US008844025B2

(12) United States Patent
Russo et al.

(10) Patent No.: US 8,844,025 B2
(45) Date of Patent: Sep. 23, 2014

(54) STORAGE DEVICE ACCESS AUTHENTICATION UPON RESUMING FROM A STANDBY MODE OF A COMPUTING DEVICE

(75) Inventors: Leonard E. Russo, Tomball, TX (US); Lan Wang, Cypress, TX (US); Jennifer E. Rios, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 13/386,836

(22) PCT Filed: Mar. 26, 2010

(86) PCT No.: PCT/US2010/028865
§ 371 (c)(1),
(2), (4) Date: Jan. 24, 2012

(87) PCT Pub. No.: WO2011/119169
PCT Pub. Date: Sep. 29, 2011

(65) Prior Publication Data
US 2012/0124663 A1    May 17, 2012

(51) Int. Cl.
*G06F 21/44* (2013.01)
*G06F 21/33* (2013.01)

(52) U.S. Cl.
CPC ........ *G06F 21/33* (2013.01); *G06F 2221/2137* (2013.01)
USPC .................. 726/19; 726/16; 726/17; 726/20; 726/21; 713/164; 713/167; 713/182; 713/185

(58) Field of Classification Search
None
See application file for complete search history.

(56) References Cited

U.S. PATENT DOCUMENTS

| 5,293,424 | A | 3/1994 | Holtey et al. | |
|---|---|---|---|---|
| 7,284,136 | B2 | 10/2007 | Zimmer et al. | |
| 7,392,415 | B2 | 6/2008 | Grawrock et al. | |
| 2006/0156035 | A1* | 7/2006 | Tran et al. | 713/193 |
| 2006/0191021 | A1* | 8/2006 | Jeong et al. | 726/29 |
| 2008/0222423 | A1 | 9/2008 | Rodriguez et al. | |
| 2008/0244737 | A1* | 10/2008 | Hayasaka | 726/21 |
| 2009/0063802 | A1 | 3/2009 | Johnson et al. | |
| 2010/0011427 | A1 | 1/2010 | Zayas | |
| 2010/0031349 | A1 | 2/2010 | Bingham | |
| 2010/0070728 | A1 | 3/2010 | James et al. | |
| 2010/0125908 | A1* | 5/2010 | Kudo | 726/19 |
| 2010/0281223 | A1* | 11/2010 | Wolfe et al. | 711/133 |

OTHER PUBLICATIONS

Notification of Transmittal of the International Search Report and the Written Opinion of the International Searching Authority, or the Declaration, Hewlett-Packard Development Company, L.P., et al., International Application No. PCT/US2010/028865 filed Mar. 26, 2010, Date of Mailing: Dec. 1, 2010, pp. 1-10.

* cited by examiner

*Primary Examiner* — Jung Kim
*Assistant Examiner* — Adrian Stoica

(57) ABSTRACT

Example embodiments disclosed herein relate to a storage device. The storage device may include a mechanism that monitors for receipt of cached authentication data from a host computing device upon resuming operation from a standby mode of the host computing device. The storage device may further include a mechanism that unlocks the storage device in response to receipt of the cached authentication data from the host computing device. In addition, the storage device may include a mechanism that monitors for receipt of re-authentication data and a mechanism that locks the storage device when a predetermined period of time has passed since resuming operation from the standby mode without receipt of the re-authentication data. Related computing devices, methods, and machine-readable storage media are also disclosed.

16 Claims, 7 Drawing Sheets

STORAGE DEVICE ACCESS AUTHENTICATION UPON RESUMING FROM A STANDBY MODE OF A COMPUTING DEVICE

CROSS-REFERENCE TO RELATED APPLICATION

This application is a national stage application under 35 U.S.C. §371 of PCT/US2010/028865, filed Mar. 26, 2010.

BACKGROUND

Providing secure data storage to users of computing devices is one of the most important pursuits in the field of computer security. Computer users store massive amounts of valuable and private information on storage devices with the expectation that the data will remain secure from unauthorized access. Compromised access to this data can have potentially disastrous consequences, including financial loss, identity theft, and public availability of private information. Unfortunately, unauthorized access to data by malicious users remains a very real threat.

In light of these concerns, storage device manufacturers have begun to implement hardware-based security for their storage devices. In particular, rather than relying on the host computing device to provide all security, some storage devices now include internal mechanisms for encrypting stored data and ensuring that access attempts originate from an authorized user. By including a mechanism that only permits access when a user is properly authenticated, the storage device may significantly decrease the likelihood of data theft, even if the storage device is stolen and removed from the host computing device.

As with any security measure, such an authentication mechanism imposes additional implementation complexity and some degree of inconvenience on the user. Many computing devices allow a user to enter a "standby" mode, in which some devices are powered off, but sufficient system context is maintained to allow the user to quickly resume operation of the computing device when desired. In existing computing devices that include a self-authenticating storage device, it is often impossible to restore the computing device from standby mode without compromising the protections provided by the storage device. In particular, in the standby mode, the system may be unable to properly authenticate access to the storage device due to, for example, a limited number of functions available to the Basic Input/Output System (BIOS) or operating system (OS) of the computing device.

BRIEF DESCRIPTION OF THE DRAWINGS

In the accompanying drawings, like numerals refer to like components or blocks. The following detailed description references the drawings, wherein.

DETAILED DESCRIPTION

As detailed above, in computing devices that include a storage device with a hardware authentication mechanism, it may be difficult or even impossible to restore operation from a standby mode without compromising data security. Thus, as described below, various embodiments relate to a computing device and related storage medium and method that allow a computing device to resume operation from a standby mode without compromising the security of the data maintained on the storage device.

In particular, in some embodiments, the host computing device may cache authentication data used to access the storage device prior to entering a standby mode. Upon entering the standby mode, the storage device may then be locked, such that the stored data is inaccessible without authentication. Upon resuming from the standby mode, the host computing device may transmit the cached authentication data to the storage device, thereby unlocking the storage device and allowing access to the data.

In addition, some embodiments include a re-authentication process to prevent a malicious user from stealing the computing device while it is in the standby mode, unlocking the storage device, then accessing the storage device from another computing device. In particular, in some embodiments, the storage device may monitor for re-transmission of the authentication data within a predetermined period of time from resuming operation from the standby mode. Such re-authentication may be a periodic re-transmission of the cached authentication data, a manual entry of the authentication data by a user of the computing device, or a combination thereof.

In this manner, embodiments disclosed herein allow a user to resume from a standby mode of the computing device without compromising the security mechanisms implemented in the storage device. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, random access memory, etc.). Furthermore, as used herein, it should be understood that the term "BIOS" refers to a legacy Basic Input/Output System, a Unified Extensible Firmware Interface (uEFI) BIOS, or any other BIOS implementation that will be known to those of skill in the art.

Figure 1:
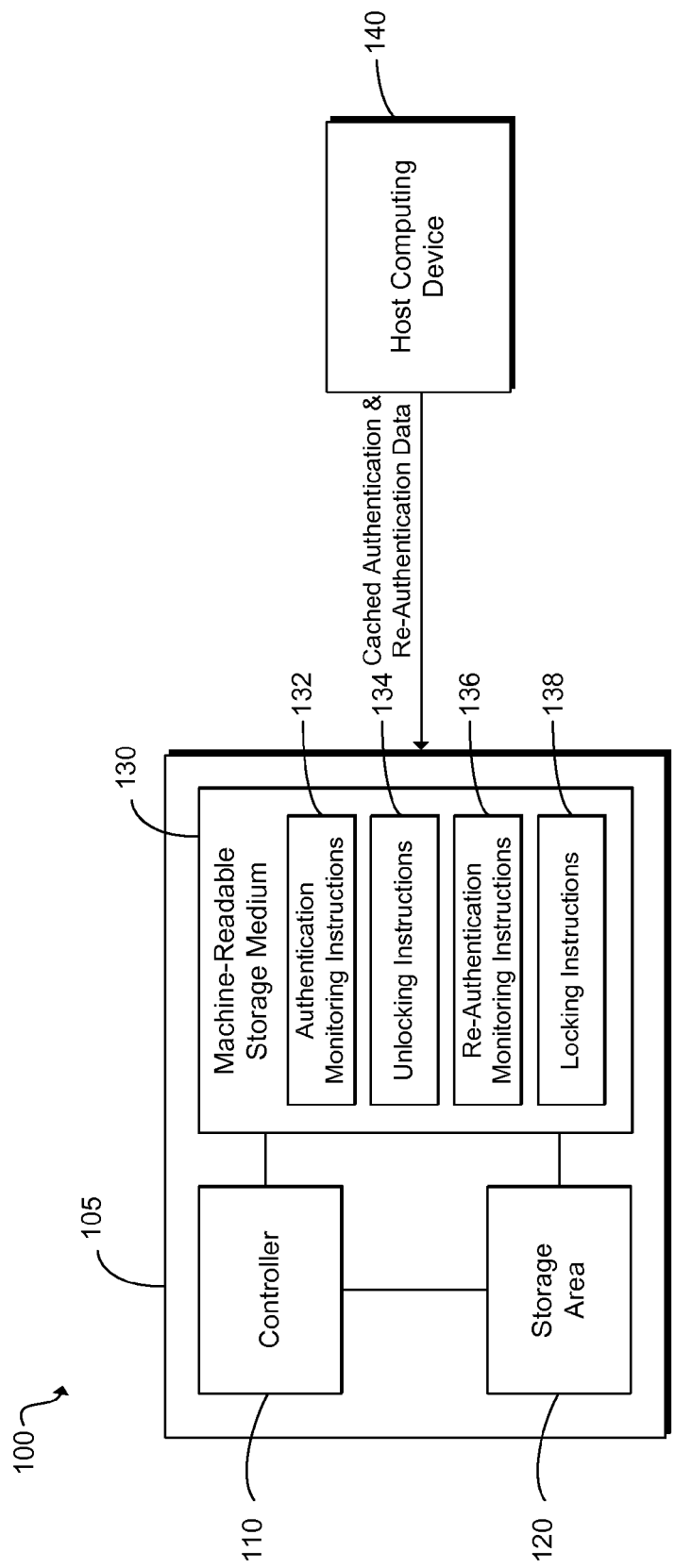
FIG. 1 is a schematic diagram of an example system including a storage device coupled to a host computing device, the system providing for authentication of the storage device upon resuming operation of the host computing device from a standby mode.

Referring now to the drawings, FIG. 1 is a schematic diagram of an example system 100 including a storage device 105 coupled to a host computing device 140. System 100 may provide for authentication of storage device 105 upon resuming operation of host computing device 140 from a standby mode.

Storage device 105 may be, for example, a hard disk drive, a solid state drive, a nanodrive, a holographic storage device, or any other storage device that may provide data storage capability to a host computing device 140. As illustrated, storage device 105 may include a controller 110, a storage area 120, and a machine-readable storage medium 130.

Controller 110 of storage device 105 may be an electrical circuit that includes logic for managing storage device 105. For example, controller 110 may be a processor, a semiconductor-based microprocessor, a microcontroller, or any other hardware device suitable for retrieval and execution of instructions stored in machine-readable storage medium 130. In particular, controller 110 may fetch, decode, and execute instructions 132, 134, 136, 138 to implement the authentication functionality described herein.

Storage area 120 of storage device 105 may comprise a number of physical media for storing data under the direction of controller 110 and host computing device 140. For example, storage area 120 may comprise a number of disks of a hard disk drive, one or more Electrically Erasable Programmable Read-Only Memory (EEPROM) or other chips, or any other physical media for storing data.

Machine-readable storage medium 130 may be an electronic, magnetic, optical, or other physical device that contains or stores executable instructions for managing the authentication process on storage device 105. As an example, machine-readable storage medium 130 may be a Read-Only Memory (ROM) chip that encodes instructions that are executable to implement the firmware of storage device 105. Controller 110 may execute the instructions encoded on machine-readable storage medium 130 to implement the functionality described in detail below.

Regardless of the particular implementation, machine-readable storage medium 130 may include authentication monitoring instructions 132 that monitor for receipt of cached authentication data from host computing device 140 upon resuming operation from a standby mode. In particular, authentication monitoring instructions 132 may be configured to await a communication from host computing device 140 that contains the authentication data upon power-on of storage device 105 from a standby mode. As a specific example, upon resuming operation of storage device 105, authentication monitoring instructions 132 may receive one or more communications sent by host computing device 140 using a protocol suitable for the particular storage interface, such as Serial Advanced Technology Attachment (SATA), Small Computer System Interface (SCSI), Serial Attached SCSI (SAS), Universal Serial Bus (USB), or Firewire.

The cached authentication data received by authentication monitoring instructions 132 may be any information used to gain access to storage device 105. For example, the cached authentication data may be an alphanumeric password previously entered by a user of host computing device 140 to gain access to storage device 105. As another example, the cached authentication data may be a piece of information stored on a USB key or other hardware device. As yet another example, the cached authentication data may be biometric data previously provided by the user, such as a fingerprint or retinal scan. Other suitable forms of the authentication data will be apparent to those of skill in the art.

Machine-readable storage medium 130 may further include unlocking instructions 134, which may unlock the storage device in response to receipt of the cached authentication data from host computing device 140. In a locked state, controller 110 may ignore requests from host computing device 140, such that the data maintained in storage area 120 is inaccessible to host computing device 140 or any other device attempting access. Upon receipt of the cached authentication data, controller 110 may verify the authentication data against actual authentication data and, when a match is detected, trigger an unlocked state of storage device 105.

In some embodiments, the locked and unlocked states may correspond to those described in the Trusted Computing Group's specification, Storage Security Subsystem Class: Opal ("TCG Opal"). In such embodiments, a locking security provider maintained in the trusted peripheral (i.e., storage device 105) may lock device 105 in response to loss of power upon entering a standby mode. Similarly, the locking security provider may unlock device 105 upon receipt of the cached authentication data upon resuming operation from the standby mode.

Machine-readable storage medium 130 may further include re-authentication monitoring instructions 136, which may monitor for receipt of additional authentication data from host computing device 140. For example, instructions 136 may await an additional communication from host computing device 140 containing a duplicate of the authentication data.

In some embodiments, the re-authentication data may be an additional copy of the cached authentication data sent by host computing device 140. Thus, in these embodiments, monitoring instructions 136 may use the re-authentication data to verify the presence of a connection between host computing device 105 and host computing device 140. In some embodiments, monitoring instructions 136 may monitor for receipt of the cached authentication data during each of a plurality of time intervals (e.g., once every ten seconds, once a minute, etc.). Such embodiments prevent a potential vulnerability in which a malicious user could resume the standby mode to trigger the automatic unlocking, then attach storage device 105 to a different computing device to gain unrestricted access to storage area 120.

In addition or as an alternative, the re-authentication data received by monitoring instructions 136 may be authentication data entered by the user of host computing device 140. In such instances, upon verification that the entered authentication data matches the actual authentication data, monitoring instructions 136 may determine that the current user of host computing device 140 is authorized to access storage area 120 and therefore halt future monitoring for the re-authentication data.

Finally, machine-readable storage medium 130 may include locking instructions 138, which may lock storage device 105 when a predetermined period of time has passed since resuming operation from the standby mode without receipt of the re-authentication data. In particular, to prevent data theft after the device is automatically unlocked using the cached authentication data, locking instructions 138 may lock storage device 105 if valid re-authentication data is not received by monitoring instructions 136 within a particular period of time (e.g., 30 seconds, 1 minute, 5 minutes, etc.) or during a particular time interval for which monitoring instructions 136 expected receipt of re-authentication data.

Host computing device 140 may be, for example, a desktop computer, a laptop computer, a server, a handheld computing device, or the like. As illustrated, host computing device 140 may be coupled to storage device 105. In some embodiments, storage device 105 is an internal component of host computing device 140, while, in other embodiments, storage device 105 is an external component connected to host computing device 140 with a cable or via a wireless connection. Regardless of the configuration, storage device 105 may be connected to host computing device 140 via an appropriate communications medium, such as a bus, cable, radio frequency field, etc.

Host computing device 140 may be configured to transmit cached authentication data and re-authentication data to storage device 105. In particular, as described in detail above, host computing device 140 may cache the authentication data upon receipt. For example, when a user enters the authentication data upon boot-up, host computing device 140 may cache the authentication data for use in the standby resume procedure. In some embodiments, host computing device 140 may encrypt the cached authentication data, such that computing device 140 may decrypt the cached authentication data when it is to be transmitted to storage device 105.

In addition, during the standby resume procedure, host computing device 140 may prompt a user for entry of the authentication data and forward the response to storage device 105. For example, host computing device 140 may include instructions that prompt a user for entry of the authentication data at a particular time relative to resuming operation from a standby mode. Upon receipt of the user's response, host computing device 140 may then transmit the response to storage device 105, which may assess the validity of the entered authentication data and take appropriate action. Additional embodiments of host computing device 140 are described in detail below in connection with host computing device 250 of FIG. 2.

Figure 2:
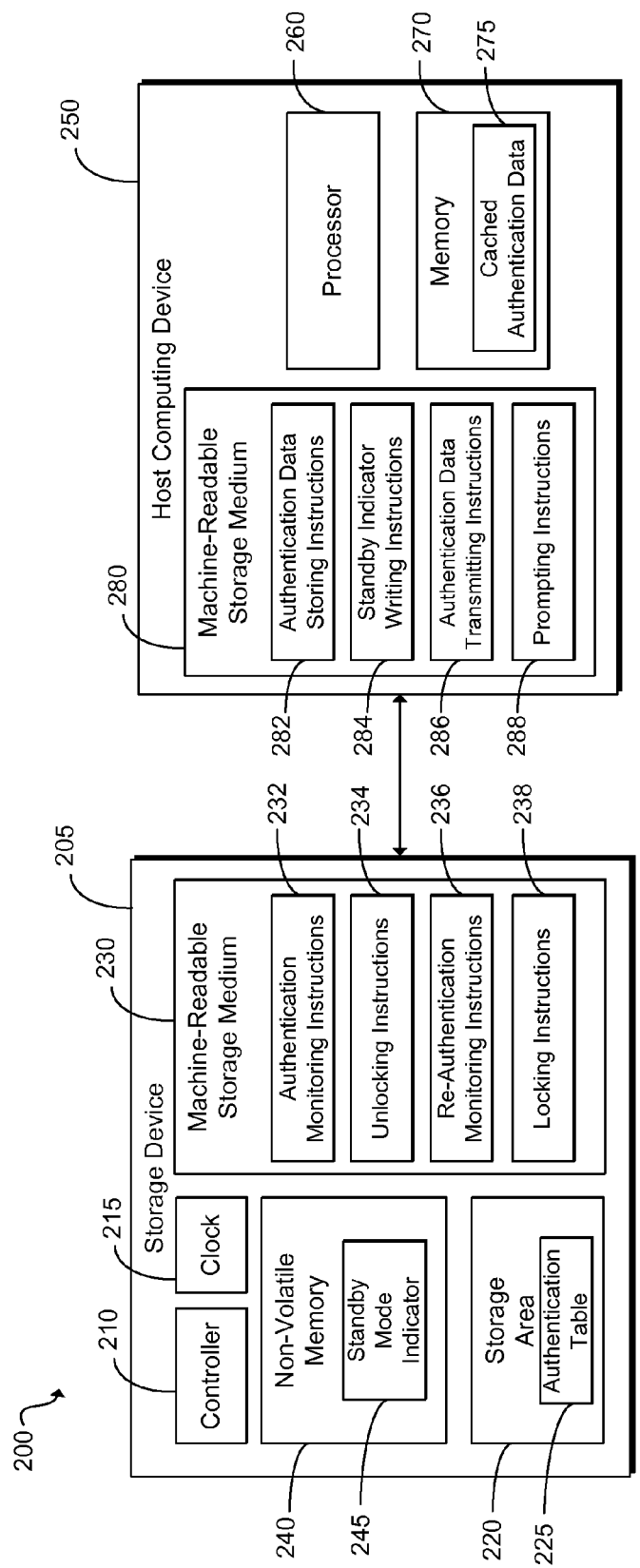
FIG. 2 is a schematic diagram of an example system including a storage device coupled to a host computing device, the system providing for authentication of the storage device upon resuming operation of the host computing device from a standby mode.

FIG. 2 is a schematic diagram of an example system 200 including a storage device 205 coupled to a host computing device 250. System 200 may provide for authentication of storage device 205 upon resuming operation of host computing device 250 from a standby mode.

As detailed above in connection with storage device 105 of FIG. 1, storage device 205 may be any device that provides data storage capability to a host computing device 250. Furthermore, as detailed above in connection with controller 110 of FIG. 1, controller 210 may be a processor, a semiconductor-based microprocessor, a microcontroller, or any other hardware device suitable for retrieval and execution of instructions stored in machine-readable storage medium 230.

Storage device 205 may also include a clock 215, which may include circuitry operable to accurately measure elapsing time. For example, clock 215 may be configured to determine a power on time of storage device 205, such that storage device 205 may determine an elapsed time by subtracting a current value of the clock from a previous value of the clock. Thus, in some embodiments, re-authentication monitoring instructions 236 and locking instructions 238 may determine whether a predetermined period of time has passed since resuming operation of computing device 250 by accessing clock 215. Clock 215 may be implemented using, for example, a Complementary Metal Oxide Semiconductor (CMOS) chip and an accompanying battery. Other suitable implementations of clock 215 will be apparent to those of skill in the art.

As with storage area 120 of FIG. 1, storage area 220 may comprise a set of one or more physical media for storing data. In addition, storage area 220 may include an authentication table 225, which may store the actual authentication data used in accessing storage device 205. For example, in embodiments in which storage device 205 is a TCG Opal trusted peripheral, authorization table may be a credentials table that maintains the actual authentication data for each authority (i.e., user). In this manner, upon a call to an authenticate method by host computing device 250, storage device 205 may access authentication table to determine whether the parameter provided by host 250 matches the value stored in the table. it should be noted that, although illustrated as a component of storage area 220, authentication table may be included in any non-volatile storage area accessible to storage device 205.

Machine-readable storage medium 230 may be an electronic, magnetic, optical, or other physical device that contains or stores executable instructions for managing the authentication process on storage device 205. Thus, as described in detail above in connection with FIG. 1, authentication monitoring instructions 232 may monitor for receipt of cached authentication data upon resuming operation from a standby mode, while unlocking instructions 234 may unlock storage device 205 in response to receipt of the cached authentication data. Similarly, re-authentication monitoring instructions 236 may monitor for receipt of additional authentication data from host computing device 250. Finally, locking instructions 238 may lock storage device 205 when a predetermined period of time has passed since resuming operation from the standby mode without receipt of the re-authentication data.

Non-volatile memory 240 may be an electronic, magnetic, optical, or other physical device that contains or stores data, such that the data is retained even when power is not provided to storage device 205. It should be noted that, although illustrated as separate from storage area 220, in some embodiments, non-volatile memory 240 and standby mode indicator 245 are included in storage area 220.

In some embodiments, non-volatile memory 240 may include a standby mode indicator, which may be a stored value that is modified when computing device 250 enters a standby mode. Standby mode indicator 245 may be, for example, a one bit value, a Boolean value, an integer, a string, or any other data type capable of two states (i.e., resuming from standby and not resuming from standby). As described below, standby indicator writing instructions 284 of host computing device 250 may transmit an instruction to storage device 205, which, in turn, may execute instructions to store standby mode indicator 245 in non-volatile memory 240. Upon power-on, storage device 205 may determine that it is resuming from a standby mode based on the value of standby mode indicator 245 and therefore trigger execution of re-authentication monitoring instructions 236.

In some embodiments, storage medium 230 may include instructions to clear standby mode indicator 245 upon a next boot of host computing device 250. For example, a boot sequence of host computing device 250 may be configured to send a command to storage device 205 to reset the value of standby mode indicator 245 and, upon receiving this command, storage device 205 may reset the value. In this manner, storage device 205 will not trigger execution of re-authentication monitoring instructions 236 unless storage device 205 is resuming from the standby mode.

As with host computing device 140 of FIG. 1, host computing device 250 may be, for example, a desktop computer, a laptop computer, a server, a handheld computing device, or the like. Furthermore, storage device 205 may be internally or externally coupled to host computing device 250. Host computing device 250 may include a processor 260, memory 270, and a machine-readable storage medium 280.

Processor 260 may be a central processing unit (CPU), a semiconductor-based microprocessor, or any other hardware device suitable for retrieval and execution of instructions stored in machine-readable storage medium 280. In particular, processor 260 may fetch, decode, and execute instructions 282, 284, 286, 288 to implement the storage device authentication functionality described herein.

Memory 270 may be a hardware device that maintains data used in the operation of host computing device 250. Thus, as an example, memory 270 may be a Random Access Memory (RAM) chip, a Dynamic Random Access Memory (DRAM) chip, or any other type of memory that will be apparent to those of skill in the art. Memory 270 may remain powered during the standby mode of host computing device 250, such that data written to memory 270 prior to entering the standby mode may be retrieved after resuming operation from the standby mode.

In some embodiments, memory 270 may store cached authentication data 275, which may maintain the authentication data used to unlock storage device 205 upon resuming operation from a standby mode. Example instructions for writing and reading cached authentication data 275 is described in detail below in connection with machine-readable storage medium 280. It should be noted that, although illustrated as included in memory 270, cached authentication data 275 may be stored in any storage medium accessible to host computing device 250 upon resuming operation from the standby mode.

As with machine-readable storage medium 130 of FIG. 1, machine-readable storage medium 280 may be an electronic, magnetic, optical, or other physical device that contains or stores executable instructions. Processor 260 of host computing device 250 may execute the instructions encoded on machine-readable storage medium 280 to implement the functionality described in detail below. These instructions 282, 284, 286, 288 may be included in, for example, a driver for storage device 205, a BIOS of computing device 250, an independent software vendor (ISV) application, or a combination thereof.

It should be noted that, although illustrated as separate from memory 270, machine-readable storage medium 280 may be the same storage device as memory 270, such that instructions 282, 284, 286, 288 are maintained in memory 270. Similarly, machine-readable storage medium 280 may be a portion of storage space in storage device 205, such as storage area 220. Other suitable locations of instructions 282, 284, 286, and 288 will be apparent to those of skill in the art.

Regardless of the particular implementation, machine-readable storage medium 280 may include authentication data storing instructions 282, which may trigger storage of a cached version of the authentication data used to authenticate access to storage device 205. As one example, instructions 282 may detect user entry of his or her authentication data (e.g., password, biometric, etc.), then cache the authentication data in memory 270. In some embodiments, authentication data storing instructions 282 may encrypt the authentication data prior to writing the data to memory 270.

Machine-readable storage medium 280 may further include standby indicator writing instructions 284, which may store an indication that host computing device 250 is entering standby mode in a location accessible to storage device 205. For example, instructions 284 may write an indicator 245 to a non-volatile memory 240 of storage device 205. In some embodiments, standby indicator writing instructions 284 may write the indicator to a system area in non-volatile memory 240, such that the indicator remains inaccessible to the user. Such embodiments are advantageous, as they prevent a malicious user from disabling or otherwise tampering with the authentication process by modifying standby mode indicator 245. As described above, storage device 205 may access this indicator 245 upon resuming operation, determine that it is resuming from the standby mode based on the value of indicator 245, then take appropriate actions to ensure that the data maintained in storage area 220 remains secure.

In addition, machine-readable storage medium 280 may include authentication data transmitting instructions 286, which may transmit the cached authentication data and re-authentication data to storage device 205. Upon resuming from a standby operation, instructions 286 may transmit the cached authentication data to storage device 205 using, for example, an authentication function call. In response, storage device 205 may unlock itself, such that access requests from host computing device 250 will be accepted.

In addition, authentication data transmitting instructions 286 may transmit re-authentication data within a predetermined period of time from resuming operation from the standby mode. As described in detail above, authentication monitoring instructions 236 of storage device 205 may expect receipt of the authentication data within a predetermined period of time after device 205 is unlocked. Accordingly, as one example, authentication data transmitting instructions 286 may transmit an additional copy of the cached authentication data. In some embodiments, such a transmission may occur on a periodic basis, thereby allowing storage device 205 to verify its connection with host computing device 250. In addition or as an alternative, authentication data transmitting instructions may forward authentication data obtained from the user by prompting instructions 288.

Prompting instructions 288 may trigger display of a request for authentication data to a user of host computing device 250. For example, prompting instructions 288 may output a text box or similar user interface element and request that the user enter the password for accessing store device 205. Similarly, prompting instructions 288 may output a prompt requesting that the user interact with one or more hardware devices to provide biometric data, such as a fingerprint or retinal scan. Other suitable prompts will be apparent to those of skill in the art based on the type of response to be obtained from the user.

Figure 3:
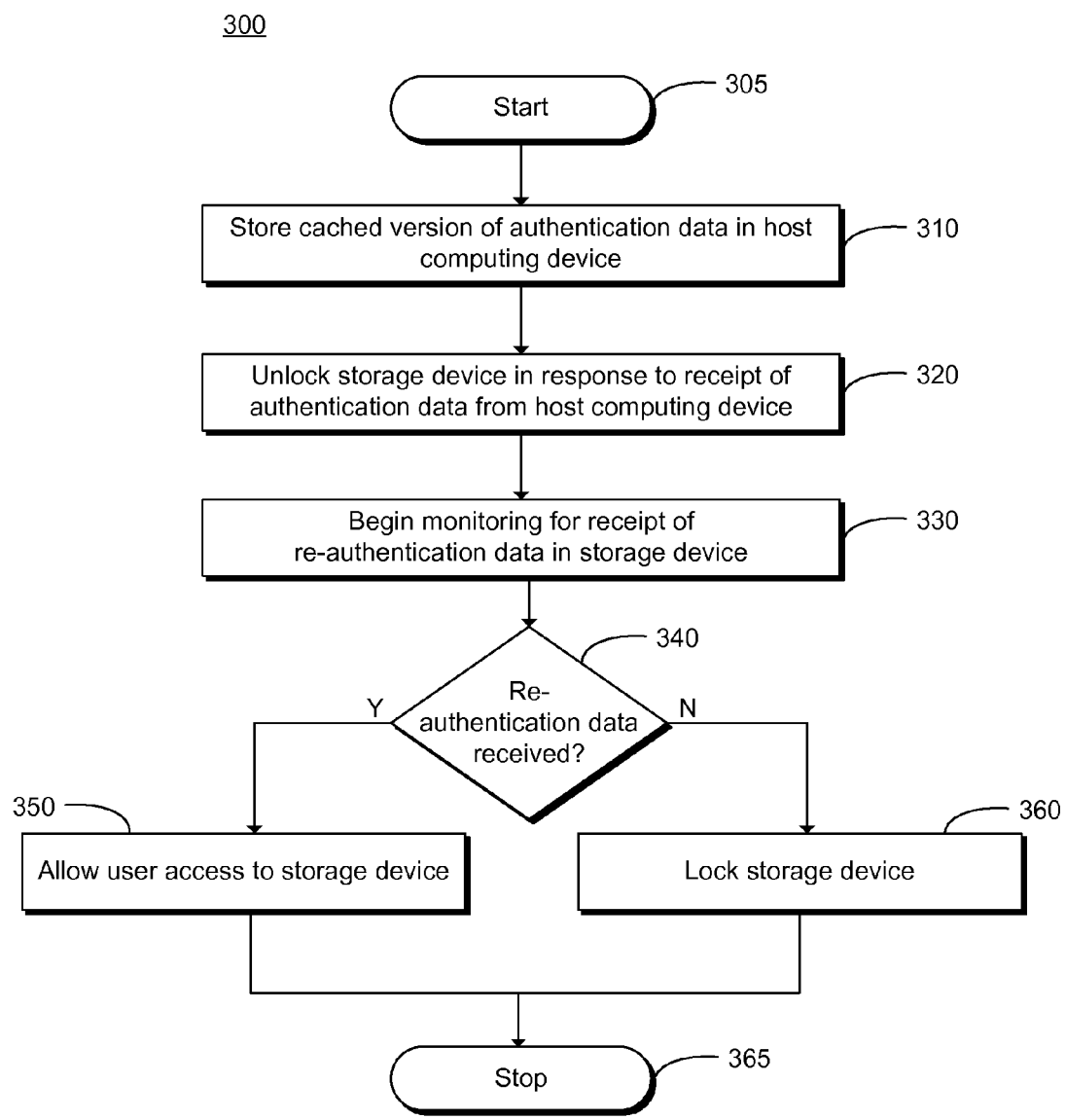
FIG. 3 is a flowchart of an example method for authenticating access to a storage device coupled to a host computing device.

FIG. 3 is a flowchart of an example method 300 for authenticating access to a storage device 205 coupled to a host computing device 250. Although execution of method 300 is described below with reference to the components of system 200, other suitable components for execution of method 300 will be apparent to those of skill in the art. Method 300 may be implemented in the form of executable instructions stored on one or more machine-readable storage media, such as machine-readable storage media 230, 280 of FIG. 2.

Method 300 may start in block 305 and proceed to block 310, where host computing device 250 may store a cached version of authentication data used to authenticate access to the storage device. As detailed above, computing device 250 may store the authentication data in a machine-readable storage medium, such as memory 270, prior to entering a standby mode. Computing device 250 may then enter the standby mode.

After resuming operation from the standby mode based, for example, on a user's command, method 300 may then proceed to block 320, where storage device 205 may unlock itself in response to receipt of the cached authentication data from host computing device 250. In particular, as detailed above, host computing device 250 may include instructions to automatically transmit the cached authentication data to storage device 205 upon resuming operation from the standby mode. In response, storage device 205 may receive the authentication data, compare it to actual authentication data, and allow access to storage area 220 when there is a match.

Method 300 may then proceed to block 330, where storage device 205 may begin monitoring for receipt of re-authentication data from host computing device 250. Storage device 205 may expect receipt of the re-authentication data from host computing device 250 within a predetermined period of time from resuming operation from the standby mode. As detailed above, the re-authentication data may be an additional transmission of the cached authentication data, entry of the authentication data by a user, or a combination thereof.

Method 300 may then proceed to block 340, where storage device 205 may determine whether the re-authentication data is received from host computing device 250. When it is determined that the re-authentication data is received within the predetermined period of time, method 300 may proceed to block 350, where storage device 205 may remain unlocked, such that the user is allowed to access storage device 205. In some embodiments, block 340 may then repeat, such that storage device 205 again expects receipt of re-authentication data within the predetermined period of time. Alternatively, method 300 may proceed to block 365, where method 300 may stop.

Alternatively, when it is determined that the re-authentication data is not received within the predetermined period of time, method 300 may proceed to block 360. In such an event, storage device 205 may conclude that its security has been compromised and may lock itself, thereby preventing further access of the data maintained in storage area 220. Storage device 205 may ignore any requests to access the data in storage area 220 until a user unlocks the drive by entering his or her authentication data. Method 300 may then proceed to block 365, where method 300 may stop.

Figure 4:
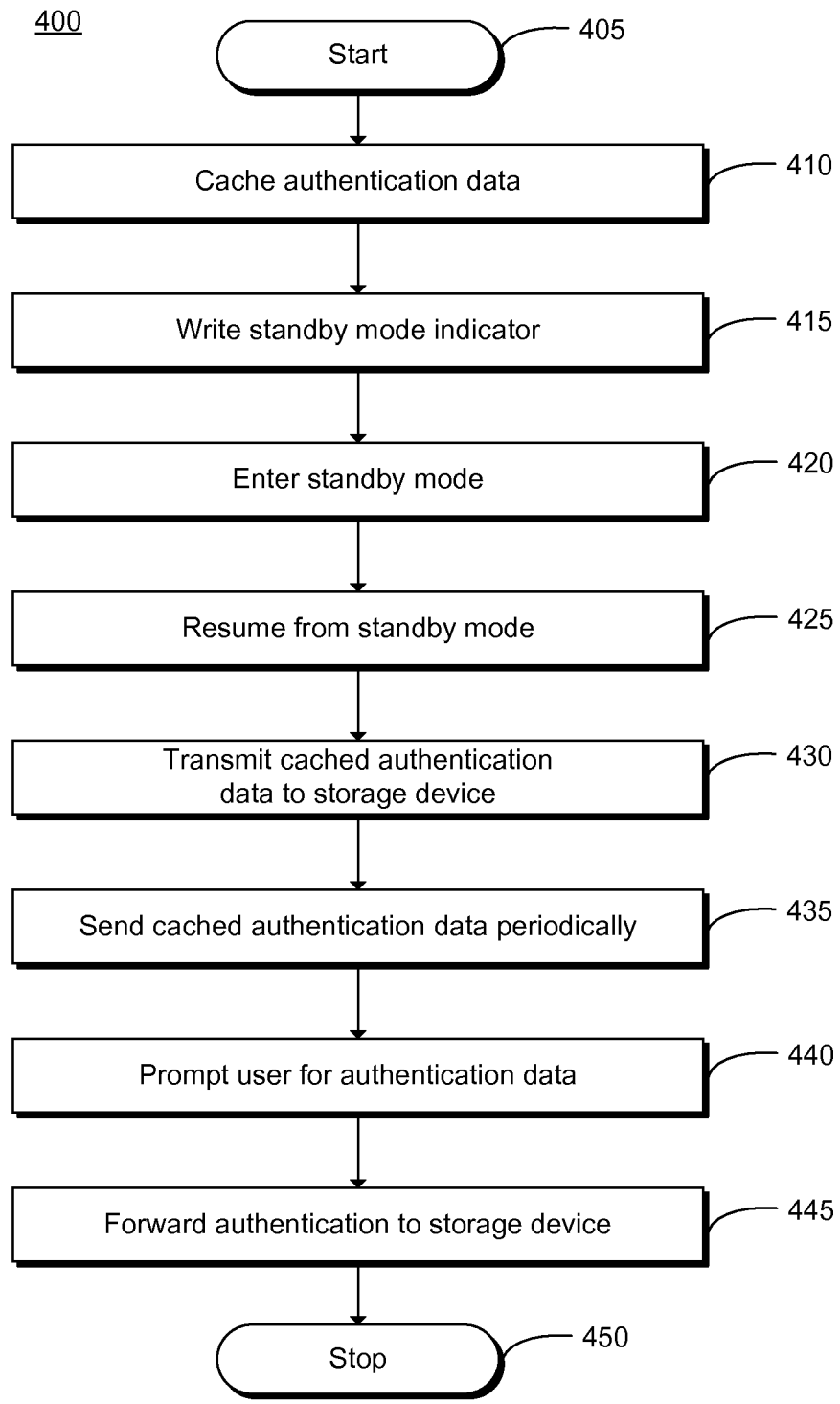
FIG. 4 is a flowchart of an example method performed by a host computing device for authenticating access to a storage device coupled to the host computing device.

FIG. 4 is a flowchart of an example method 400 performed by a host computing device for authenticating access to a storage device coupled to the host computing device. Although execution of method 400 is described below with reference to the components of host computing device 250, other suitable components for execution of method 400 will be apparent to those of skill in the art. Method 400 may be implemented in the form of executable instructions stored on a machine-readable storage medium, such as storage medium 280 of host computing device 250.

Method 400 may start in block 405 and proceed to block 410, where host computing device 250 may store a cached version of the data used to authenticate access to storage device 205. As detailed above, host computing device 250 may obtain this data at any time prior to entering the standby mode and may store the cached data in any location accessible to host computing device 250.

Method 400 may then proceed to block 415, where host computing device 250 may write a standby mode indicator to storage device 205. For example, host computing device 250 may send a write command to storage device 205 indicating that the indicator should be written to a predetermined location on storage device 205. Alternatively, host computing device 250 may simply send a command notifying storage device 205 that it is entering the standby mode. In response, storage device 205 may write an indicator to an appropriate location, such as non-volatile memory 240.

Method 400 may then proceed to block 420, where host computing device 250 may enter the standby mode. This mode may be initiated, for example, based on a button press, keyboard entry, or interface element selection by a user of host computing device 250. In some embodiments, the standby mode is the S3 mode, as defined in the Advanced Configuration and Power Interface (ACPI) specification. During the S3 mode (also known as "sleep" mode), power is not supplied to processor 260. In addition, memory 270 may be in a slow refresh mode, while a power supply of host computing device 250 may be in a reduced power mode. Other suitable hardware states in standby mode will be apparent to those of skill in the art.

In block 425, host computing device 250 may resume from standby mode. As with entering the standby mode, the resume operation may initiated based on, for example, a button press, a keyboard entry, or an interface element selection by a user of host computing device 250.

After resuming operation from the standby mode, method 400 may proceed to block 430, where host computing device 250 may transmit cached authentication data 275 to storage device 205, thereby triggering an unlock operation by storage device 205. The transmission of cached authentication data may occur automatically by including an authentication function call in a routine that is executed upon resuming from a standby mode, such as a resume method of the BIOS or a storage device driver.

Method 400 may then proceed to block 435, where host computing device 250 may begin periodic transmission of the cached authentication data to storage device 205, which is now expecting periodic receipt of re-authentication data. Thus, host computing device 250 may transmit the cached authentication data to storage device 205 at regular intervals, thereby verifying the connection between storage device 205 and host computing device 250.

It should be noted that, in some embodiments, host computing device 250 may require a user to enter his or her access credentials (e.g., operating system or domain password) prior to accessing data and applications on the system. Thus, in such embodiments, a malicious user will be unable to access data on storage device 205 using host computing device 250 even though storage device 205 is unlocked. Furthermore, should the malicious user attempt to remove storage device 205 for attachment to a different system, storage device 205 would not receive the cached authentication data and would therefore lock itself.

After beginning the periodic transmission of the cached authentication data, method 400 may then proceed to block 440, where host computing device 250 may prompt the user for entry of his or her authentication data. In some embodiments, the prompting of the user may occur concurrently with block 435, thereby ensuring that storage device 205 receives the cached authentication data until the user enters the authentication data. After receipt of the authentication data from the user, method 400 may proceed to block 445, where host computing device 250 may forward the received authentication data to storage device 205.

In some embodiments, upon transfer of valid authentication data from the user, storage device 205 may no longer expect periodic receipt of re-authentication data, as it may be determined that the current user is authorized to access storage device 205. Accordingly, host computing device 250 may halt the periodic transmission of the cached authentication data. After transmission of the user-entered authentication data to storage device 205, method 400 may proceed to block 450, where method 400 may stop.

Figure 5A:
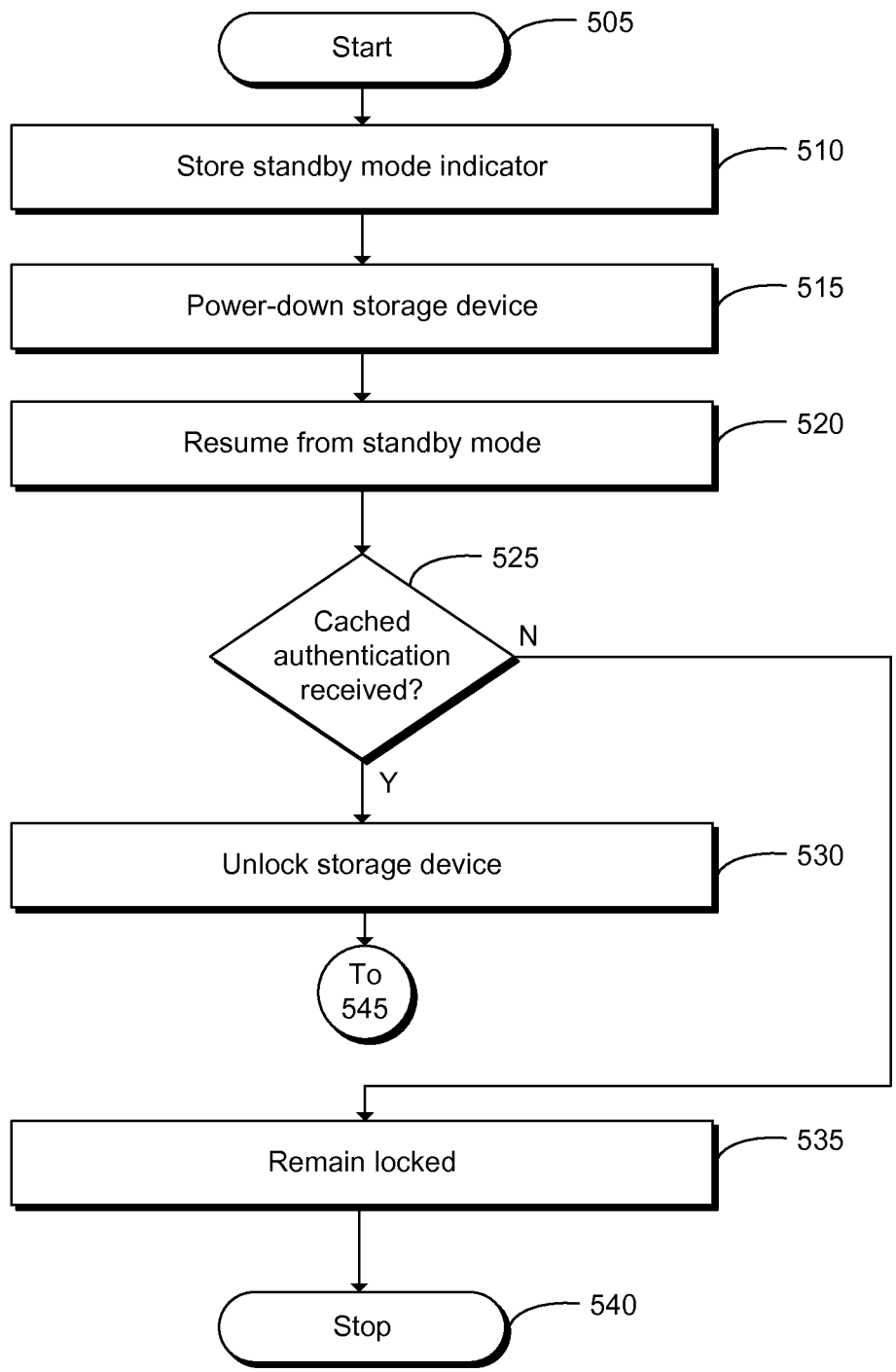
FIGS. 5A & 5B are flowcharts of an example method performed by a storage device for authenticating access by a user of a host computing device.
Figure 5B:
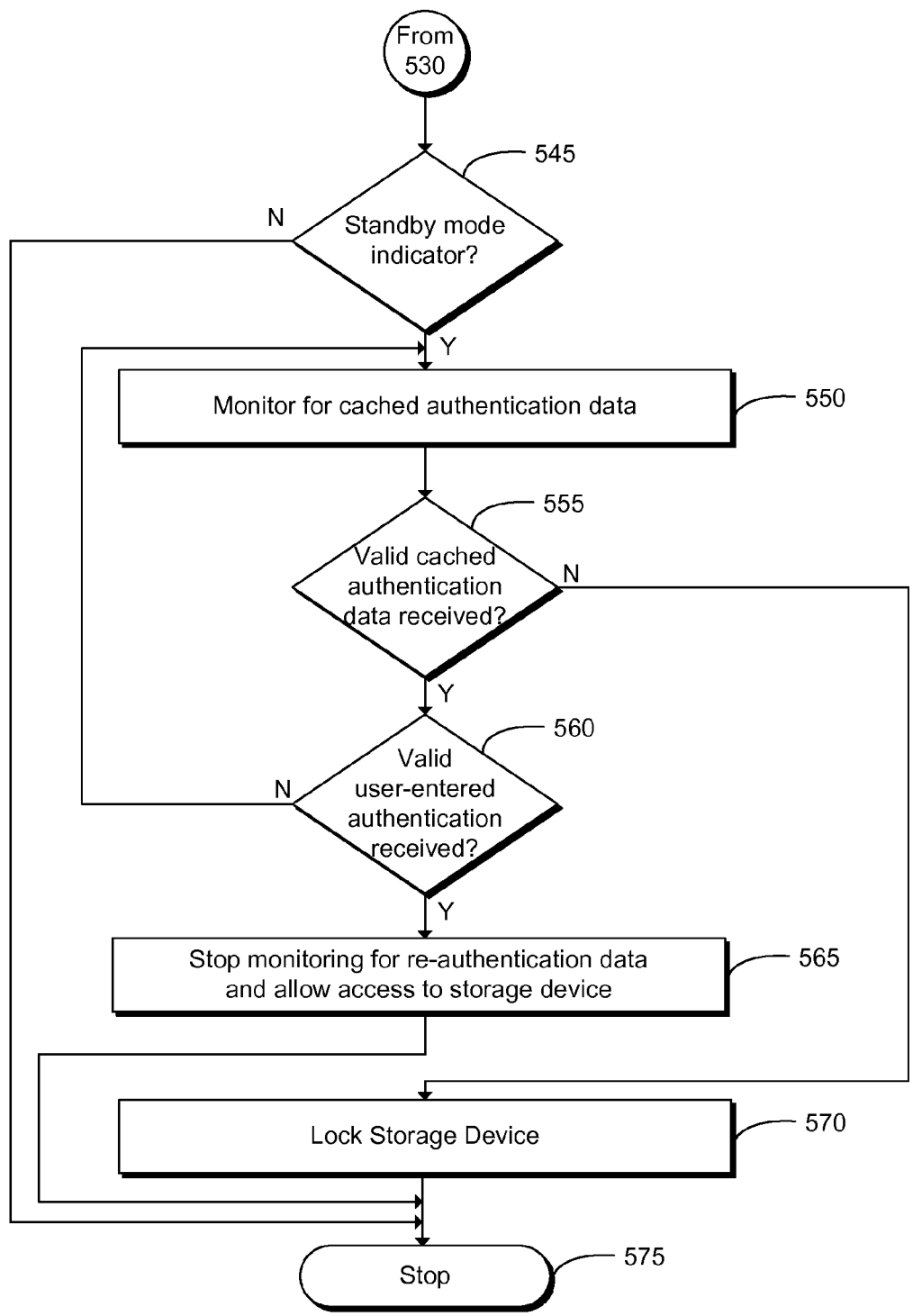

FIGS. 5A & 5B are flowcharts of an example method 500 performed by a storage device for authenticating access by a user of a host computing device. Although execution of method 500 is described below with reference to the components of storage device 205, other suitable components for execution of method 500 will be apparent to those of skill in the art. Method 500 may be implemented in the form of executable instructions stored on a machine-readable storage medium, such as machine-readable storage medium 230 of storage device 205.

Method 500 may start in block 505 and proceed to block 510, where storage device 205 may store a standby mode indicator in response to an instruction received from host computing device 250. Storage device 205 may store a one bit value, a Boolean value, a string, or any other data sufficient to indicate at least two states (i.e., standby and not standby). As one example, storage device 205 may store the standby mode indicator in non-volatile memory 240. Method 500 may then proceed to block 515, where storage device 205 may be powered down in preparation for entering the standby mode.

Upon receipt of a command from the user to resume operation, method 500 may proceed to block 520, where storage device 205 may resume from the standby mode. In particular, storage device 205 may receive power, such that its internal components are now operable.

Method 500 may then proceed to block 525, where storage device 205 may monitor for receipt of the cached authentication data from host computing device 250. When storage device 205 receives the cached authentication data within a predetermined period of time, method 500 may proceed to block 530, where storage device 205 may unlock itself and method may then proceed to block 545 of FIG. 5B.

Alternatively, when the cached authentication data is not received within a predetermined period of time, method 500 may proceed to block 535, where storage device 205 may remain locked. Storage device 205 will then remain unlocked until receipt of valid authentication data from a user of host computing device 250. Method 500 may then proceed to block 540, where method 500 may stop.

Referring now to FIG. 5B, in block 545, after the device is unlocked, storage device 205 may determine whether a standby mode indicator is present on storage device 205. When such an indicator is not present, storage device 205 may determine that the device is not resuming from a standby and therefore proceed to block 575, where method 500 may stop. Alternatively, when the standby mode indicator is present, storage device 205 may determine that the device is resuming from standby mode and therefore proceed to block 550.

In block 550, storage device 205 may begin monitoring for receipt of cached authentication data from host computing device 250. To verify the connection between storage device 205 and host computing device 250, storage device 205 may expect receipt of the cached authentication data during each of a plurality of time intervals. In some embodiments, these intervals may be of a fixed duration (e.g., 1 second, 10 seconds, 1 minute, etc.) and may be measured using clock 215 of storage device 205.

After expiration of a particular time interval, method 500 may proceed to block 555, where storage device 205 may determine whether valid cached authentication data was received during the interval. When it is determined that cached authentication data was not received or that the received authentication data is invalid, method 500 may proceed to block 570, where storage device 205 may lock itself. Storage device 205 may remain locked until receipt of proper authentication data from a user of host computing device 250. Method 500 may then proceed to block 575, where method 500 may stop.

Alternatively, when it is determined in block 555 that valid authentication data was received, method 500 may proceed to block 560. In block 560, storage device 500 may determine whether valid authentication data was entered by the user in response to a prompt from host computing device 250. When it is determined that the user has not entered valid authentication data, method 500 may return to block 550, where storage device 205 may continue to monitor for cached authentication data during a next time interval. In this manner, until it is established that the user of host computing device 250 has a legitimate access right, storage device 205 may continue to verify the connection between storage device 205 and host computing device 250.

Alternatively, when it is determined in block 560 that the user has entered valid authentication data, method 500 may proceed to block 565. In block 565, storage device 205 may determine that the user of host computing device 250 has a legitimate right to access the data and therefore halt the process of monitoring for receipt of re-authentication data. Method 500 may then proceed to block 575, where method 500 may stop.

Figure 6:
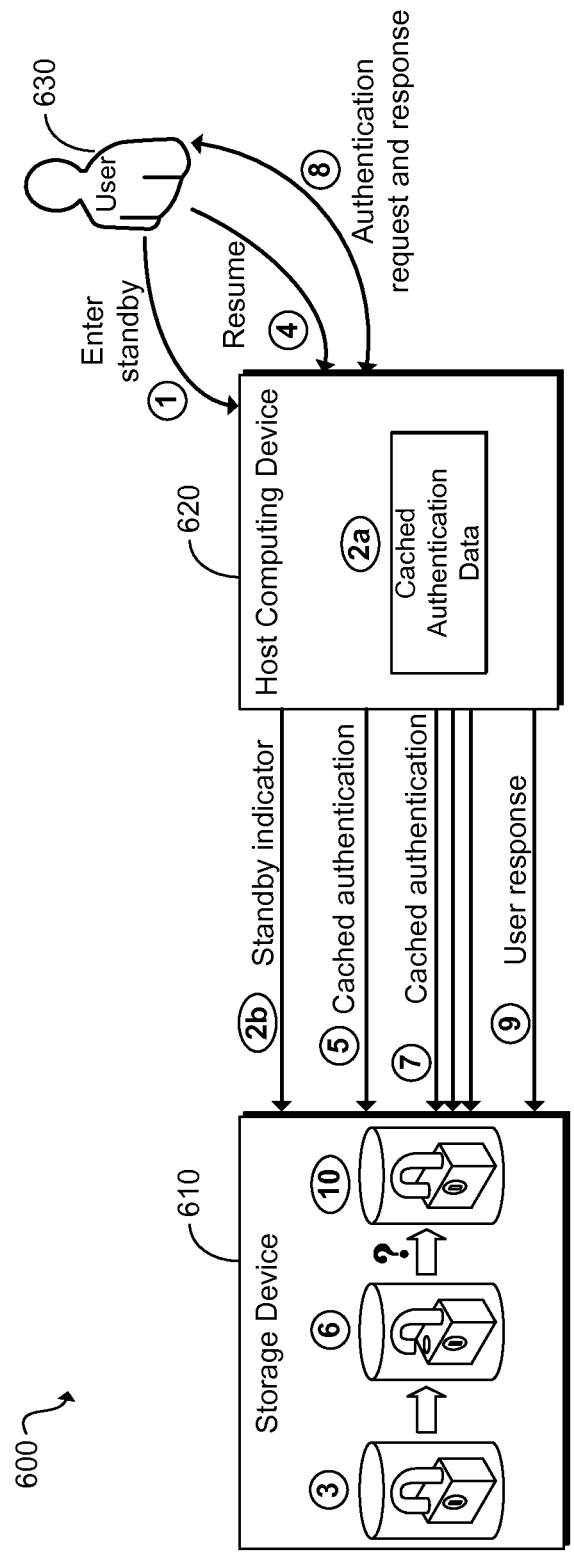
FIG. 6 is a schematic diagram of an example operation flow for authentication of a storage device upon resuming operation of a host computing device from a standby mode.

FIG. 6 is a schematic diagram of an example operation flow 600 for authentication of a storage device 610 upon resuming operation of a host computing device 620 from a standby mode. As illustrated, FIG. 6 includes a storage device 610, a host computing device 620, and a user 630 of host computing device 620. Storage device 610 may correspond, for example, to storage devices 105, 205 of FIGS. 1 and 2, respectively. Similarly, host computing device 620 may correspond, for example, to host computing devices 140, 250 of FIGS. 1 and 2, respectively.

As illustrated, in block 1 of operation flow 600, user 630 may issue a command to enter a standby mode of host computing device 620. For example, user 630 may press a power or standby button on host computing device 620, press a predetermined key or combination of keys, or access a standby option from a menu of the operating system of host computing device 620.

In block 2a of operation flow 600, host computing device 620 may execute a method to cache authentication data for storage device 610 prior to entering the standby mode. For example, host computing device 620 may store previously-entered authentication data (e.g., a password, biometric, etc.) in a predetermined location of a storage medium of host computing device 620. As another example, host computing device 620 may request that user 630 re-enter the authentication data prior to entering the standby mode.

In block 2b, host computing device 620 may issue an instruction for storage device 610 to store a standby mode indicator in a non-volatile storage medium. The standby mode indicator may be, for example, a single bit value of "1," a Boolean value of "True," or any similar value sufficient to indicate to storage device 610 that it is resuming from a standby mode.

Next, in block 3 of operation flow 600, storage device 610 may determine that it is no longer receiving power from host computing device 620 and therefore lock itself. In this manner, storage device 610 will block all access requests by host computing device 620 and any other device until the requesting device properly re-authenticates.

In block 4 of operation flow 600, user 630 may determine that he or she wishes to resume from standby mode. User 630 may therefore resume operation of computing device 630 from standby mode by, for example, pressing a power or resume button or entering a predetermined key sequence.

Upon determining that it is resuming from the standby mode, host computing device 620 may execute block 5 of operation flow 600. In particular, host computing device 620 may transmit the cached authentication data to storage device 610. As an example, computing device 620 may call an authenticate function of storage device 610 using the user's identity and the cached authentication data as parameters. In response, in block 6, storage device 610 may unlock itself, such that host computing device 620 may now access data maintained in storage device 610.

In block 7, host computing device 620 may begin transmitting the cached authentication data on a periodic basis. In this manner, storage device 610 may verify its connection with host computing device 620. In block 8, host computing device 620 may send an authentication request to user 630, requesting that user 630 provide his or her authentication data (e.g., a password, biometric, etc.). Upon receiving the response from the user, host computing device 620 may forward the response to storage device 610 in block 9.

During execution of blocks 7, 8 and 9, storage device 610 may be monitoring for receipt of the authentication data. Should host computing device 620 fail to provide either the cached authentication data or the user-entered authentication data, storage device 610 may again lock itself in block 10. In particular, storage device 610 may expect host computing device 620 to periodically provide the cached authentication data. In such embodiments, if host computing device 620 fails to provide the cached authentication data or if user 630 enters invalid authentication data, storage device 610 may again lock itself, such that the data will be inaccessible until proper authentication occurs.

According to the foregoing, various embodiments provide a mechanism that allows a user to access a secured storage device upon resuming from a standby mode of a host computing device, while maintaining data security. In particular, by caching authentication data on the host computing device prior to the standby mode, the host computing device may unlock the device upon resuming operation from the standby mode. In order to provide additional security and protect against data theft, the storage device may also monitor for receipt of re-authentication data upon resuming operation and, when the re-authentication data is not received, lock itself. In this manner, various embodiments minimize inconvenience to legitimate users, while ensuring that data remains protected from malicious users.

We claim:

1. A storage device comprising:
    a controller; and
    a non-transitory machine-readable storage medium encoded with instructions executable by the controller, the machine-readable storage medium comprising:
        instructions for monitoring for receipt of cached authentication data from a host computing device coupled to the storage device upon resuming operation from a standby mode of the host computing device,
        instructions for unlocking the storage device in response to receipt of the cached authentication data from the host computing device,
        instructions for monitoring for receipt of re-authentication data,
        instructions for locking the storage device when a predetermined period of time has passed since resuming operation from the standby mode without receipt of the re-authentication data,
        instructions for monitoring for receipt of entered authentication data from a user of the host computing device, and
        instructions for halting monitoring for receipt of the re-authentication data when the entered authentication data from the user matches actual authentication data.

2. The storage device of claim 1, wherein the instructions for monitoring for receipt of the entered authentication data comprise:
    instructions for accessing an authentication table of the storage device to determine the actual authentication data, and
    instructions for comparing the entered authentication data to the actual authentication data to determine whether the user is authenticated.

3. The storage device of claim 1, wherein:
    the instructions for monitoring for receipt of the re-authentication data comprise instructions for verifying a connection between the host computing device and the storage device by monitoring for receipt of the cached authentication data from the host computing device during each of a plurality of time intervals.

4. The storage device of claim 1, further comprising:
    instructions for storing a standby mode indicator in a non-volatile storage medium of the storage device in response to initiation of the standby mode of the host computing device; and
    instructions for triggering execution of the instructions for monitoring for receipt of re-authentication data in response to detection of the standby mode indicator stored in the storage device during a resume procedure of the host computing device from the standby mode.

5. The storage device of claim 4, wherein monitoring for receipt of the re-authentication data is not performed in response to detecting that the standby indicator is not stored in the storage device.

6. The storage device of claim 4, further comprising:
    instructions for clearing the standby mode indicator in response to an instruction from the host computing device issued upon a next boot of the host computing device.

7. The storage device of claim 1, further comprising:
    instructions for accessing a clock included in the storage device to determine whether the predetermined period of time has passed.

8. A computing device comprising:
    at least one processor;
    a storage device comprising a non-volatile storage medium; and
    a machine-readable storage medium encoded with instructions executable by the at least one processor to cause the at least one processor to:
        store cached authentication data used to authenticate access to the storage device,
        send an instruction to the storage device to store a standby mode indicator in the non-volatile storage medium of the storage device, in response to initiation of a standby mode of the computing device,
        transmit the cached authentication data to the storage device upon resuming operation from the standby mode,
        transmit re-authentication data to the storage device within a predetermined period of time from resuming operation from the standby mode, the re-authentication data to cause the storage device to, in response to detecting presence of the standby mode indicator stored in the non-volatile storage medium of the storage device, monitor whether the re-authentication data is received within the predetermined period of time, and
        transmit, to the storage device, entered authentication data from a user of the computing device,
    wherein the storage device is to halt monitoring for receipt of the re-authentication data when the entered authentication data from the user matches actual authentication data.

9. The computing device of claim 8, wherein:
    storing the cached authentication data comprises storing the cached authentication data in Random Access Memory (RAM) of the computing device, and
    the RAM of the computing device remains powered during the standby mode.

10. The computing device of claim 8, wherein the standby mode indicator is stored in a system area of the non-volatile storage medium of the storage device inaccessible to a user of the computing device.

11. The computing device of claim 8, wherein the standby mode of the computing device is an Advanced Configuration and Power Interface (ACPI) S3 mode.

12. A method for authenticating access to a storage device coupled to a host computing device, the method comprising:
   unlocking the storage device in response to receipt of cached authentication data from the host computing device upon the host computing device resuming operation from a standby mode, the cached authentication data stored at the host computing device and received from the host computing device in response to resuming operation by the host computing device from the standby mode;
   after the unlocking, monitoring for periodic receipt of the cached authentication data in the storage device during each of a plurality of time intervals;
   locking the storage device when a particular time interval has passed since resuming operation from the standby mode without receipt of the cached authentication data from the host computing device; and
   halting the monitoring for periodic receipt of the cached authentication data upon receipt of entered authentication data from a user that matches actual authentication data for accessing the storage device.

13. The method of claim 12, further comprising:
   writing, upon initiation of the standby mode of the host computing device, a standby mode indicator in a non-volatile storage medium of the storage device,
   wherein monitoring for the periodic receipt of the cached authentication data is in response to detection of the standby mode indicator in the non-volatile storage medium.

14. A non-transitory machine-readable storage medium encoded with instructions executable by a storage device to cause the storage device to:
   receive a standby indicator from a computing device that is responsive to the computing device entering a standby mode;
   store the standby indicator in the storage device;
   monitor for receipt of cached authentication data from the computing device upon resuming from a standby mode of the computing device;
   unlock the storage device in response to receipt of the cached authentication data from the computing device;
   after the unlocking, monitor for receipt of re-authentication data from the computing device, wherein monitoring for receipt of the re-authentication data is triggered by the storage device in response to detecting presence of the standby indicator stored in the storage device;
   lock the storage device in response to determining that the re-authentication data has not been received within a predetermined period of time since resuming from the standby mode; and
   monitor for receipt of entered authentication data from a user of the computing device, and
   halt monitoring for receipt of the re-authentication data when the entered authentication data from the user matches actual authentication data.

15. The storage device of claim 1, wherein the instructions for locking the storage device:
   uses a clock in the storage device to measure an elapsed time from resuming operation from the standby mode, and
   compares the measured elapsed time to the predetermined period of time, and
   locks the storage device in response to determining that the measured elapsed time exceeds the predetermined period of time and the re-authentication data has not been received during the elapsed time.

16. The non-transitory machine-readable storage medium of claim 14, wherein monitoring for receipt of the re-authentication data is not performed in response to detecting lack of presence of the standby indicator in the storage device.

* * * * *